Patented Aug. 14, 1923. 1,464,710

UNITED STATES PATENT OFFICE.

ARTHUR W. HIXSON, OF LEONIA, NEW JERSEY, ASSIGNOR TO THE FLEISCHMANN COMPANY, OF NEW YORK, N. Y., A CORPORATION OF OHIO.

PROCESS OF PRETREATING DRIED YEAST TO INCREASE THE BAKING STRENGTH.

No Drawing. Application filed December 20, 1920. Serial No. 432,037.

*To all whom it may concern:*

Be it known that I, ARTHUR W. HIXSON, a citizen of the United States, residing at Leonia, in the county of Bergen and State of New Jersey, have invented certain new and useful Improvements in Processes of Pretreating Dried Yeast to Increase the Baking Strength, of which the following is a specification.

This invention relates to processes of pretreating dried yeasts to increase the baking strength, and it comprises a method wherein yeast is allowed to stand in a fermentable sugar solution of about 4° to 6° Balling, for from 12 to 24 hours to which may be added 0.5 to 1 per cent of 100 grain vinegar, or its equivalent of any non-toxic acid, and less than 0.5 per cent of non-toxic calcium salts.

The ordinary compressed yeast deteriorates very quickly even when kept in a refrigerator, and loses its baking qualities in about a week. In a copending application, filed December 20, 1920, Serial No. 432,038, I have disclosed a dried yeast product and a method of making the same, which product retains its baking strength for about one month and then gradually deteriorates.

In the present invention, I have discovered a process of pretreating yeast which may be employed in connection with the ordinary compressed yeast, but which is particularly applicable for use in connection with my dried yeast product.

It has heretofore been proposed to revivify yeast by allowing the yeast to stand in a sugar solution before using it, but I am unaware of any prior process wherein the pretreatment is extended over such periods of time or wherein non-toxic acid is added to the sugar solution, or calcium salts are specifically added to the sugar solution.

In practicing the process, a solution of fermentable sugar may be employed and any suitable non-toxic acid may be used. The calcium salts added to the solution evidently serve as activators of the gas producing enzymes, and I have found that calcium sulfate and calcium phosphate are best suited for this purpose.

In one form of the invention, I employ a solution of malt extract of about 4° to 6° Balling in which the yeast is allowed to stand at a temperature of substantially 28° C., for a period of from 12 to 24 hours and preferably about 18 hours. The yeast is added to the solution in the proportion of about 8 per cent dried yeast to the weight of the diluted malt extract.

While the addition of non-toxic acids and calcium salts is not essential, I find that the baking strength can be further improved and the possibilities of infection by bacteria eliminated by adding to the solution 10 to 20 per cent, and preferably about 15 per cent by weight on the basis of said concentrated malt extract, of 100 grain vinegar, or its equivalent of acetic acid or other non-toxic acid.

To the solution containing the acetic acid or other non-toxic acid, I may also add any non-toxic salts of calcium, and particularly calcium sulfate and calcium phosphate which evidently serve as activators of the gas producing enzymes. The sulfate may be employed in the proportions of less than 10 per cent, and preferably about 5 per cent by weight of the concentrated malt extract. I find it advisable to use calcium phosphate in proportions less than 5 per cent, and preferably about 2.5 per cent by weight of the concentrated malt extract.

When the yeast is allowed to stand in a solution of the above character, either with or without the addition of the salts and acids for a period of substantially 18 hours, the baking strength of the yeast is increased, and a material is produced which is substantially the equivalent of fresh yeast. The pretreatment also permits the use of about 25 per cent less yeast than would otherwise occur.

In place of the malt extract, any fermentable sugar may be employed, and I have found that good results may be obtained even when a solution of sucrose is used. When a sucrose solution is used, I find it advantageous to employ potassium acid tartrate in place of the acetic acid. The calcium phosphate and calcium sulfate may be employed in substantially the same proportions, and I also find it advantageous to add a small amount of a soluble phosphate, such as ammonium di-hydrogen phosphate to the mixture. This ammonium phosphate serves as a source of ammonia nitrogen. In addition to the above, any non-toxic salts of sodium, potassium and chlorine may be added to the solution.

While the following proportions are capable of wide variations, when employing sucrose, I find it advisable to use the materials in about the following relative proportions: sucrose 250 parts; potassium acid tartrate 5 parts; sodium chlorid 2 parts; calcium sulfate 18 parts; calcium phosphate (CaHPO$_4$) 9 parts; ammonium di-hydrogen phosphate 5 parts. This mixture is dissolved in water to form a 6 per cent solution, and to this, dried yeast is added in the proportion of 8 grams of the yeast to 100 grams of the solution. The solution is maintained at a temperature of substantially 28° C. during the pretreating process, and the treatment is continued from 12 to 24 hours, and preferably about 18 hours.

While I have described in detail the preferred practice of my process, it is to be understood that the details of procedure may be widely varied, without departure from the spirit of the invention or the scope of the subjoined claims.

Having thus described my invention, I claim:

1. A fermentable solution comprising a mixture of malt extract, and substantially 1 per cent of 100 grain vinegar.

2. A fermentable solution comprising a mixture of malt extract, substantially 1 per cent of 100 grain vinegar, substantially one-quarter per cent of calcium sulfate, and substantially one-eighth per cent of calcium phosphate.

3. A fermentable solution comprising a fermentable sugar solution containing substantially 5 per cent of fermentable sugar, .3 per cent calcium sulfate, .2 per cent calcium phosphate, .1 per cent potassium acid tartrate, .1 per cent ammonium di-hydrogen phosphate, and less than .1 per cent sodium chlorid.

In testimony whereof I affix my signature in presence of two witnesses.

ARTHUR W. HIXSON.

Witnesses:
MARTIN A. ALBERT.
FRANK C. ERB.